United States Patent
Sitaraman et al.

(10) Patent No.: US 7,864,785 B1
(45) Date of Patent: Jan. 4, 2011

(54) METHOD AND APPARATUS FOR CREATING BUNDLE OF SOFT PERMANENT VIRTUAL CIRCUITS

(75) Inventors: Aravind Sitaraman, Karnataka (IN); Sandesh K. Rao, Karnataka (IN); Karthik Dakshinamoorthy, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 1063 days.

(21) Appl. No.: 10/698,807

(22) Filed: Oct. 31, 2003

(51) Int. Cl.
*H04L 12/56* (2006.01)
(52) U.S. Cl. .................... 370/399; 370/395.2
(58) Field of Classification Search ............. 370/395.2, 370/397, 399, 409
See application file for complete search history.

(56) References Cited

U.S. PATENT DOCUMENTS

| | | | | |
|---|---|---|---|---|
| 5,946,313 | A * | 8/1999 | Allan et al. | 370/397 |
| 6,560,242 | B1 * | 5/2003 | Hamedani et al. | 370/467 |
| 6,771,650 | B1 * | 8/2004 | Veeneman et al. | 370/397 |
| 7,133,420 | B2 * | 11/2006 | Chang et al. | 370/496 |
| 7,277,443 | B2 * | 10/2007 | Goode et al. | 370/400 |

OTHER PUBLICATIONS

Cisco Systems, Inc. "*IP to ATM Class of Service Overview*", Aug. 21, 2000, Copyright 1989-2000, pp. 1-8, http://www.cisco.com/univercd/cc/td/doc/product/software/ios121/121cgcr/qos_c/qcptr7/q.

Cisco Systems, Inc., by Keith Travis, "*IP-ATM CoS: Providing Differential Class-Based IP Services on ATM Fabrics*", Copyright 1998, pp. 1-9.

\* cited by examiner

*Primary Examiner*—Ricky Ngo
*Assistant Examiner*—Chandrahas Patel
(74) *Attorney, Agent, or Firm*—Patent Capital Group

(57) ABSTRACT

A method and apparatus create a bundle of soft permanent virtual circuits (SPVCs) coupling form a source end to a destination end via a communications network. The SPVC bundle includes a plurality of member SPVCs, each member SPVC including a permanent virtual circuit (PVC) and a switched virtual circuit (SVC). The SPVC bundle creation includes (a) creating the SPVC bundle for the source end, each of the member SPVCs being associated with a respective connection characteristic and coupling to the same destination, and (b) transmitting, from the source end to the destination end, an SPVC setup message containing configuration information of the SPVC bundle. The SPVC bundle creation may further includes automatically creating, at the destination end, in response to the SPVC setup message, the SPVC bundle for the destination end in accordance with the configuration information.

51 Claims, 6 Drawing Sheets

METHOD AND APPARATUS FOR CREATING BUNDLE OF SOFT PERMANENT VIRTUAL CIRCUITS

FIELD OF THE INVENTION

The present invention relates to computer internetworking and telecommunications. More particularly, the present invention relates to a method and apparatus for creating a bundle of soft permanent virtual circuits coupling from a source end to a destination end.

BACKGROUND OF THE INVENTION

Asymmetric transfer mode (ATM) virtual circuit (VC) bundle management allows configuration of multiple VCs between any pair of ATM-connected network devices such as routers. Conventionally, such a bundle management is limited to permanent virtual circuits (PVCs). Each of the multiple VCs has its own quality of service (QoS) characteristics, ATM traffic class, and ATM traffic parameters, but are grouped into a bundle and coupled to the same destination. These PVCs referred to as bundle members. Using PVC bundles, differentiated service can be provided by flexibly distributing IP precedence levels over the different PVC bundle members. A single precedence level or a range of levels can be mapped to each discrete PVC in the bundle, and individual PVCs in the bundle carry packets marked with corresponding precedence levels.

FIG. 1 schematically illustrates a conventional ATM PVC bundle implementation. A source network device 10 (such as a router) typically receives data IP packets carrying different IP precedence levels from various networks (or other routers) and host computers. A bundle 12 of PVCs is coupled from the source network device 10 to a destination network device 14 through an ATM network 16. Each path of PVCs has to be explicitly configured throughout the network. That is, all of the links between the endpoints are manually configured for each of the member PVCs in accordance with IP precedent levels. The IP precedent level is carried, for example, by the value set in the IP precedence bits of the type of service (ToS) byte of the header of a packet.

Switched virtual circuit (SVC) bundles have also been implemented in order to alleviate the PVC bundles' configuration intensive feature, in which the user (system administrator) manually configures the source and destination endpoints, and the paths between the endpoints are set up automatically. However, manually configuring each of the member SVCs (currently up to 8 member SVCs) at both endpoints is still cumbersome, and also susceptible to configuration errors and mismatches.

There is the third of VCs: Soft Permanent Virtual Circuits (SPVCs). An SPVC is a hybrid of the PVC and SVC, and typically includes PVC connections at the both end and an SVC connection therebetween. For example, a first PVC is set up from an edge router to a first network device, an SVC is set up from the first network device to a second network device via a communications network such as ATM network, and a second PVC is set up from the second network device to an edge router. Typically, the SVC connection is set up inside a "trusted" network such as a Service Provider network or a private corporation network, and the edge routers are outside of the secured or private network and thus "un-trusted." An SPVC can be explicitly configured using the PVC portion. The SVC portion of an SPVC can be automatically rerouted in case of a link-failure or the like, implementing clear retry mechanism. SPVCs are important and widely-deployed connection type in ATM network implementing scalable and dynamic routing protocols such as Private Network-Node Interface (PNNI).

However, although SPVC connections are preferred by many users and widely used in various scenarios, there is no VC bundle management for SPVCs coupling across a communications network such as an ATM network. That is, even if an incoming connection (IP packets) may carry IP precedence levels, for example, in the ToS byte of the IP header, there is no mapping of IP precedence levels to SPVCs. Thus, all of IP packets with various IP precedence levels are carried to the destination by a single SPVC with a given characteristic. This results in the loss of QoS preservation across the ATM network when SPVCs are used to carry IP traffic.

BRIEF DESCRIPTION OF THE INVENTION

A method and apparatus create a bundle of soft permanent virtual circuits (SPVCs) coupling form a source end to a destination end via a communications network. The SPVC bundle includes a plurality of member SPVCs, each member SPVC including a permanent virtual circuit (PVC) and a switched virtual circuit (SVC). The SPVC bundle creation includes (a) creating the SPVC bundle for the source end, each of the member SPVCs being associated with a respective connection characteristic and coupling to the same destination, and (b) transmitting, from the source end to the destination end, an SPVC setup message containing configuration information of the SPVC bundle. The SPVC bundle creation may further include automatically creating, at the destination end, in response to the SPVC setup message, the SPVC bundle for the destination end in accordance with the configuration information.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
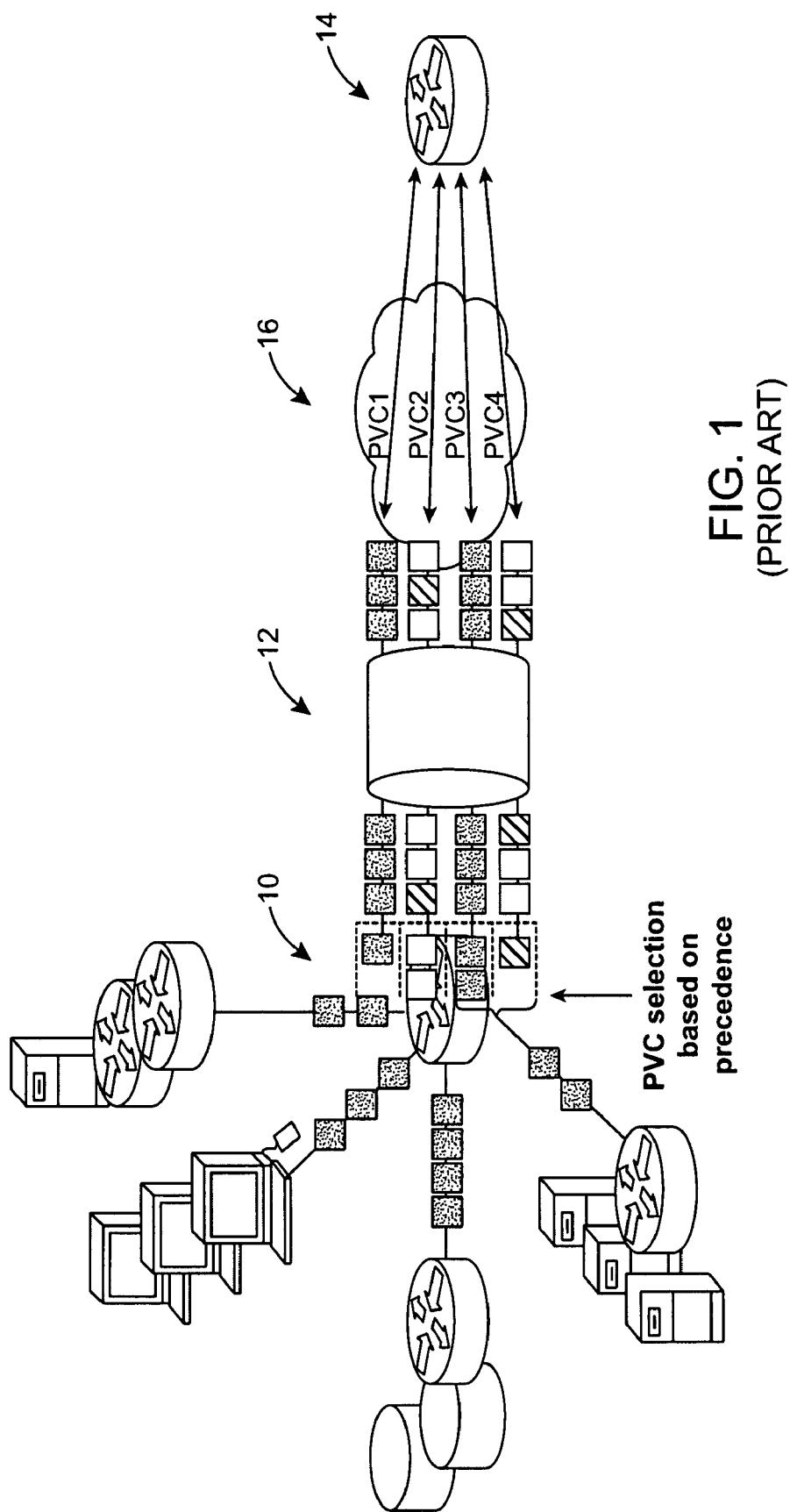
FIG. 1 is a diagram schematically illustrating a conventional ATM PVC bundle implementation.

Embodiments of the present invention are described herein in the context of a method and apparatus for creating a bundle of soft permanent virtual circuits. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be implemented as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Sun Microsystems, Inc. of Palo Alto, Calif., Microsoft® Windows® XP and Windows® 2000, available form Microsoft Corporation of Redmond, Wash., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet.

In the context of the present invention, the term "network" includes local area networks (LANs), wide area networks (WANs), the Internet, cable television systems, telephone systems, wireless telecommunications systems, fiber optic networks, ATM networks, frame relay (FR) networks, satellite communications systems, and the like. Such networks are well known in the art and consequently are not further described here.

Figure 2:
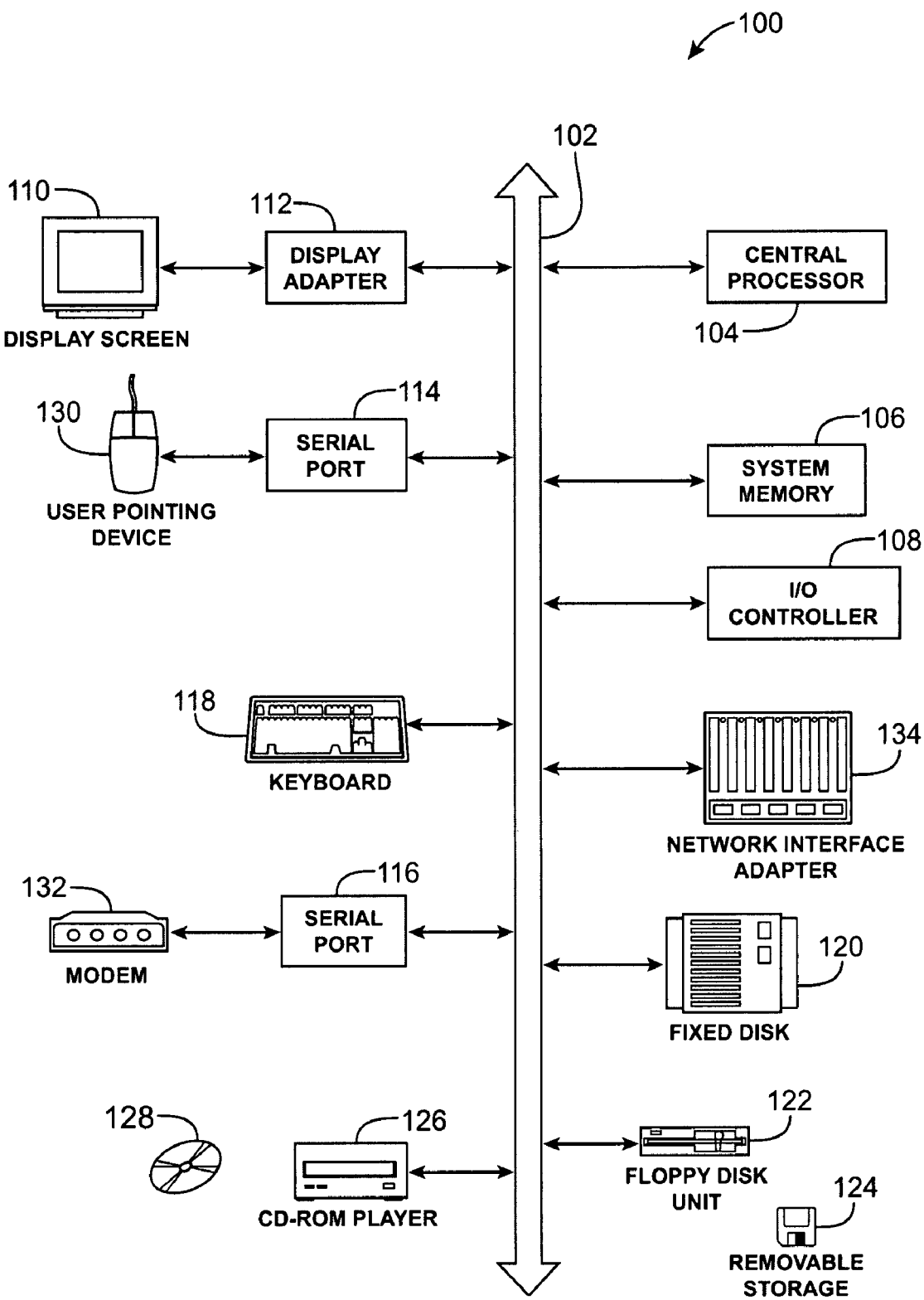
FIG. 2 is a block diagram schematically illustrating a computer system suitable for implementing aspects of the present invention.

FIG. 2 depicts a block diagram of a computer system 100 suitable for implementing aspects of the present invention. As shown in FIG. 2, computer system 100 includes a bus 102 which interconnects major subsystems such as a central processor 104, a system memory 106 (typically RAM), an input/output (I/O) controller 108, an external device such as a display screen 110 via display adapter 112, serial ports 114 and 116, a keyboard 118, a fixed disk drive 120, a floppy disk drive 122 operative to receive a floppy disk 124, and a CD-ROM player 126 operative to receive a CD-ROM 128. Many other devices can be connected, such as a pointing device 130 (e.g., a mouse) connected via serial port 114 and a modem 132 connected via serial port 116. Modem 132 may provide a direct connection to a remote server via a telephone link or to the Internet via a POP (point of presence). Alternatively, a network interface adapter 134 may be used to interface to a local or wide area network using any network interface system known to those skilled in the art (e.g., Ethernet, xDSL, AppleTalk™).

Many other devices or subsystems (not shown) may be connected in a similar manner. Also, it is not necessary for all of the devices shown in FIG. 2 to be present to practice the present invention, as discussed below. Furthermore, the devices and subsystems may be interconnected in different ways from that shown in FIG. 2. The operation of a computer system such as that shown in FIG. 2 is readily known in the art and is not discussed in detail in this application, so as not to overcomplicate the present discussion. Code to implement the present invention may be operably disposed in system memory 106 or stored on storage media such as fixed disk 120, floppy disk 124 or CD-ROM 128.

Figure 3:
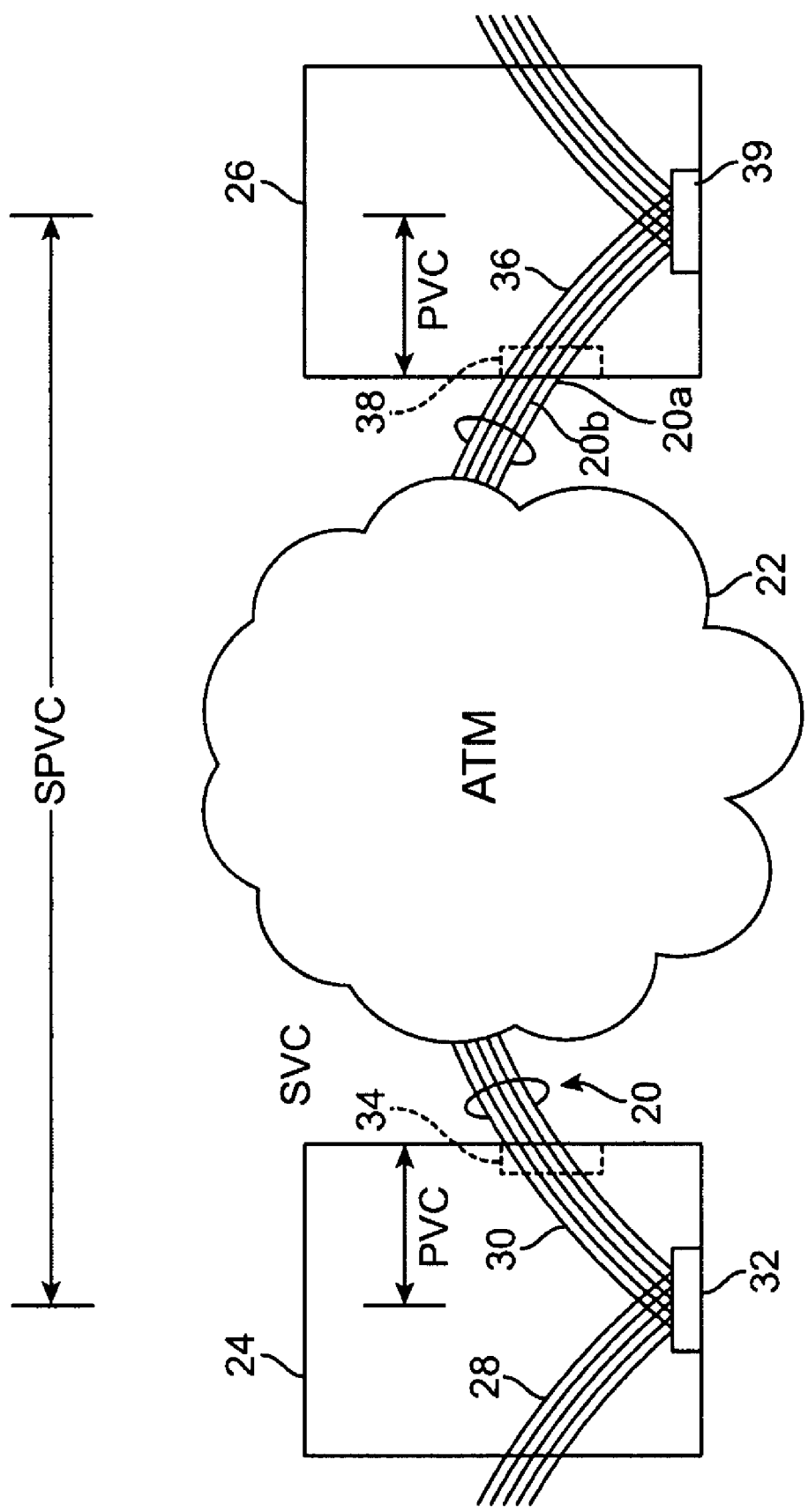
FIG. 3 is a diagram schematically illustrating an implementation of a bundle of SPVCs coupling form a source end to a destination end via a communications network in accordance with one embodiment of the present invention.

FIG. 3 schematically illustrates a bundle 20 of SPVCs coupling form a source end to a destination end via a communications network 22, such as an ATM network, in accordance with one embodiment of the present invention. The SPVC bundle 20 is created from a source network device 24 to a destination network device 26. For example, this embodiment can be implemented in a Digital Subscriber Line (DSL) environment in which the source network device 24 receives incoming connections 28 having various IP precedence levels from customer premises equipment (CPE). The first and second network devices may be implemented using ATM switch routers which are capable of functioning as both an edge router and an ATM switch.

The bundle 20 includes a plurality of member SPVCs 20a, 20b, . . . , for example, eight (8) member SPVCs. Each of the member SPVCs in the bundle 20 couples to the same destination (the destination network device 26), but is associated with a respective connection characteristic. Thus, based on a specific connection characteristic of an incoming connection, for example, an IP precedence level of an IP packet, an appropriate member SPVC is selected from among the member SPVCs in the bundle 20. As shown in FIG. 3, in this example, the PVC part 30 of the SPVC connection is provided as a cross-connection (PVC leg) between a receiving interface 32 and a transmitting interfaces 34 of the network device 24. Similarly, in the destination network device 26, the PVC connection leg 36 is formed between the two interfaces 38 and 39.

Figure 4:
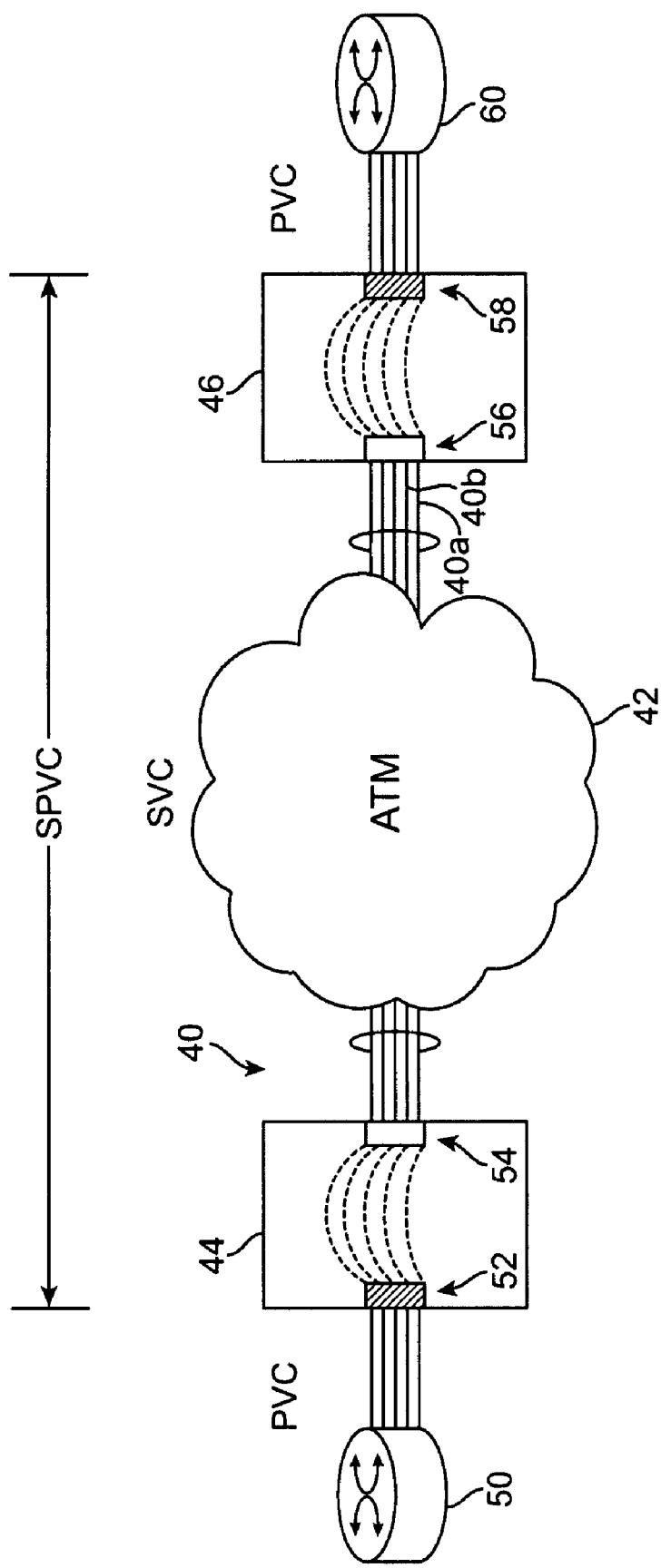
FIG. 4 is a diagram schematically illustrating another implementation of a bundle of SPVCs coupling form a source end to a destination end via a communications network in accordance with one embodiment of the present invention.

FIG. 4 schematically illustrates another implementation of a bundle 40 of SPVCs coupling form a source end to a destination end via a communications network 42 such as an ATM network, in accordance with one embodiment of the present invention. Similarly to the previous example, the SPVC bundle 40 is created from a source network device 44 to a destination network device 46. In this implementation, the PVC part of each of the SPVC connections is coupled from a source end (such as an edge router) 50 to the source network device 44, and the PVC connection leg 52 is cross-connected to the SVC connection leg 54 in the source network device 44. Although only one edge router 50 is shown, more than one edge routers or host computers may be coupled to the source network device 44 (similarly to FIG. 1). The source network device 44 receives various incoming connections of different connection characteristics the same destination, and one of the member SPVCs 40a, 40b, . . . is selected from the SPVC bundle 40 coupling to the destination network device 46. Similarly, in the destination network device 46, the SVC connection leg 56 is cross-connected to the PVC connection leg 58, and the PVC part is coupled to the destination end such as an edge router 60.

Figure 5:
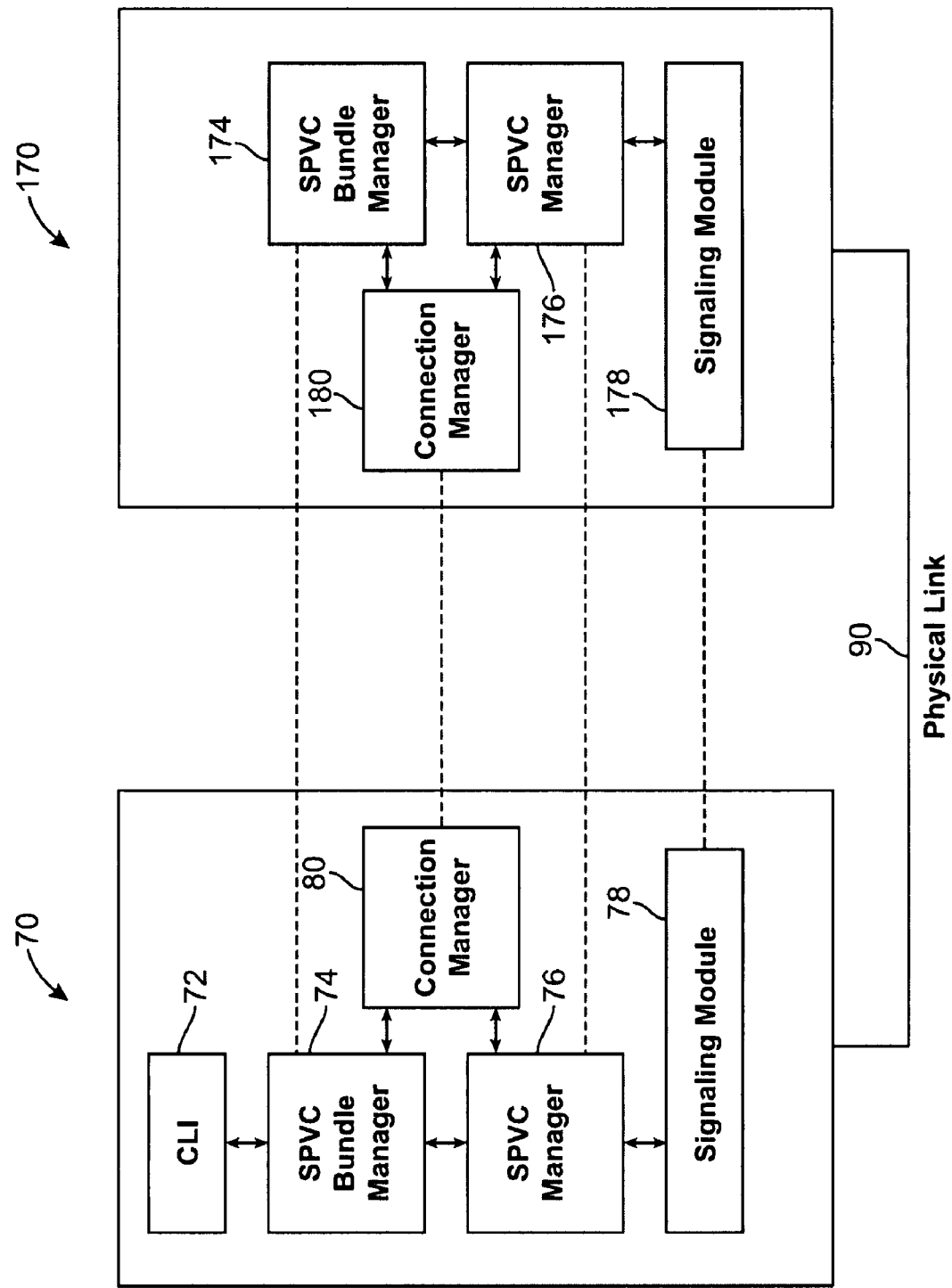
FIG. 5 is a block diagram schematically illustrating a source network device and a destination network device for creating a bundle of SPVCs coupling form a source end to a destination end via a communications network, in accordance with one embodiment of the present invention.

FIG. 5 schematically illustrates a source network device 70 and a destination network device 170 for creating a bundle of SPVCs coupling form a source end to a destination end via a communications network, in accordance with one embodiment of the present invention. The communications network is typically an ATM network, but the present invention is also applicable to other networks so long as such networks supports a signaling scheme utilized by the network device devices 70 and 170.

As shown in FIG. 5, the source network device 70 includes an interface 72, an SPVC bundle manager 74 coupled to the interface 72, an SPVC manager 76 coupled to the SPVC bundle manager 74, and a signaling module 78 coupled to the SPVC manager 76. The interface 72 is adapted to receive commands and parameters to create an SPVC bundle. For example, the interface 72 may be a command line interface (CLI). The SPVC bundle includes a plurality of member SPVCs, and each of the member SPVCs includes a permanent virtual circuit (PVC) and a switched virtual circuit (SVC). Each of the member SPVCs in the bundle is coupled the same destination. For example, such a bundle of SPVCs may be the SPVC bundle 20 or the SPVC bundle 40 described above.

Typically, the parameters received at the interface 72 include bundle-level parameters and member-level parameters specific to individual member SPVCs. The bundle-level parameters are common to all of the member SPVCs, and define and configure the bundle. The interface 72 may have a "bundle mode" to receive the bundle-level parameters and a "member mode" to receive the member-level parameters. The bundle-level parameters include, for example, a bundle identifier (for example, bundle name), and bundle configuration parameters such as IP address, network service access point (NSAP) address, encapsulation parameters, address map parameters, and the like. The member-level parameters include, for example, quality of service (QoS) parameters, traffic parameters, virtual path identifier/virtual channel identifier (VPI/VCI) values, and the like, which are configured for an individual SPVC in general. In addition, the member-level parameters include IP precedence levels and parameters specifying bumping rules, which are specific for a member SPVC in an SPVC bundle. There may be eight (8) IP precedence levels, for example, #0 to #7. For example, IP precedence level #0 may associated with unspecified bit rate (UBR), level #2 may be associated with video data, level #3 may be associated with voice data, and the like. Typically, an IP precedence level corresponds to a type of service (ToS) bits in the IP header of an incoming IP packet.

In accordance with the bumping rule, if one of the member SPVCs (or the corresponding interface) fails, the traffic bound on the failed member SPVC is dynamically assigned to an alternative member SPVC, typically, an SPVC carrying data corresponding to a lower IP precedence level. The bumping rule specifies to which member SPVC the traffic should be bumped when a specific member SPVC goes down.

The SPVC bundle manager 74 is adapted to configure the SPVC bundle in accordance with the parameters received from the interface 72. The member SPVCs are configured such that each member is associated with a respective connection characteristic. The connection characteristic includes, for example, an IP precedence level of an incoming connection (IP packet) as described above. One IP precedence level or a range of EP precedence levels can be associated with one member SPVC. For example, IP precedence level #0 is mapped onto a first member SPVC, IP precedence levels #2 and 3 are mapped onto a second member SPVC, and the like. The SPVC bundle manager 74 passes the bundle-level and member-level configuration data to the SPVC manager 76.

The SPVC manager 76 is adapted to create an SPVC bundle setup request and SPVC bundle information based on the configuration data received from the SPVC bundle manager 74. For example, the SPVC manager 76 generates the SPVC bundle information by formatting the configuration data into a specific data format for SPVC creation. The signaling module 78 is adapted to encode the SPVC bundle information into an SPVC setup message in response to the SPVC bundle set up request, and then transmits the SPVC setup message to the destination network device 170. For example, the signaling module 78 may be an ATM signaling module employing PNNI protocol. The SPVC setup message containing the SPVC bundle information may be transmitted using the Generic Application Transport information element (GAT IE) in the PNNI format.

In addition, when the bumping protection described above occurs in response to failure of a member SPVC (or the corresponding interface), and then the failed member SPVC comes up, the source network device 70 can allocate the original SPVC path to the bumped traffic/IP precedence using the retry mechanism, and also automatically reconfigure the SPVC bundle at the destination side using the signaling mechanism. Conventionally, however, once a specific traffic on a PVC or SVC is bumped to another member in a conventional PVC or SVC bundle, there was no means to restore the original traffic allocation other than manually reconfiguring the PVC or SVC bundle.

As shown in FIG. 5, the source network device 79 may further include a connection manager 80 coupled to the SPVC bundle manager 74. The connection manager 80 is adapted to allocate a PVC connection and an SVC connection of each of the member SPVCs on the source network device 70. In addition, the connection manager 80 may also be coupled to the SPVC manager 76 which controls allocation of connection fabric for individual SPVCs which are not member of an SPVC bundle. If the source network device 70 is also capable of creating non-bundled PVCs and SVCs, it may further include a PVC manager and SVC manager (not shown) coupled the connection manager 80.

At the destination side, as shown in FIG. 5, the destination network device 170 includes an SPVC bundle manager 174 coupled to the interface 172, an SPVC manager 176 coupled to the SPVC bundle manager 174, a signaling module 178 coupled to the SPVC manager 176, and a connection manager 180. That is, the destination network device 170 has the modules/managers corresponding to that of the source network device 70 except the interface 72. Since the destination network device 170 functions as a "passive" device which automatically creates an SPVC bundle in accordance with the signaling message sent from the source network device 70, it does not need to have an interface to receive commands and parameters for manual configuration. As shown in FIG. 5, although the source network device 70 and the destination network device 170 are connected via a physical link 90, each module/manager in the destination network device 170 handles information or data handled by its peer module/manager in the source network device 70 to create the SPVC bundle.

The signaling module 176 is adapted to receive and decode the SPVC setup message containing SPVC bundle information. The decoded SPVC bundle information is sent to the SPVC bundle manager 174 through the SPVC manager 176. The SPVC bundle manager 174 is adapted to extract the parameters from the SPVC bundle information and to create the SPVC bundle. That is, having the parameters and information necessary to create the SPVC bundle (as described above), the SPVC bundle manager 174 can create the SPVC bundle in the same manner as the SPVC bundle manager 74. It should be noted that the parameters received from the interface 72 at the source network device 70 may contain the IP address (and/or NSAP address) of the destination network device 170 to specify the destination address of a specific SPVC bundle, the SPVC bundle setup massage from the source network device 70 may contain the IP address (and/or NSAP address) of the source network device 170 to specify the source of the SPVC bundle. The connection manager 180 allocates a PVC connection and an SVC connection of each member SPVC on the destination network device 170.

Figure 6:
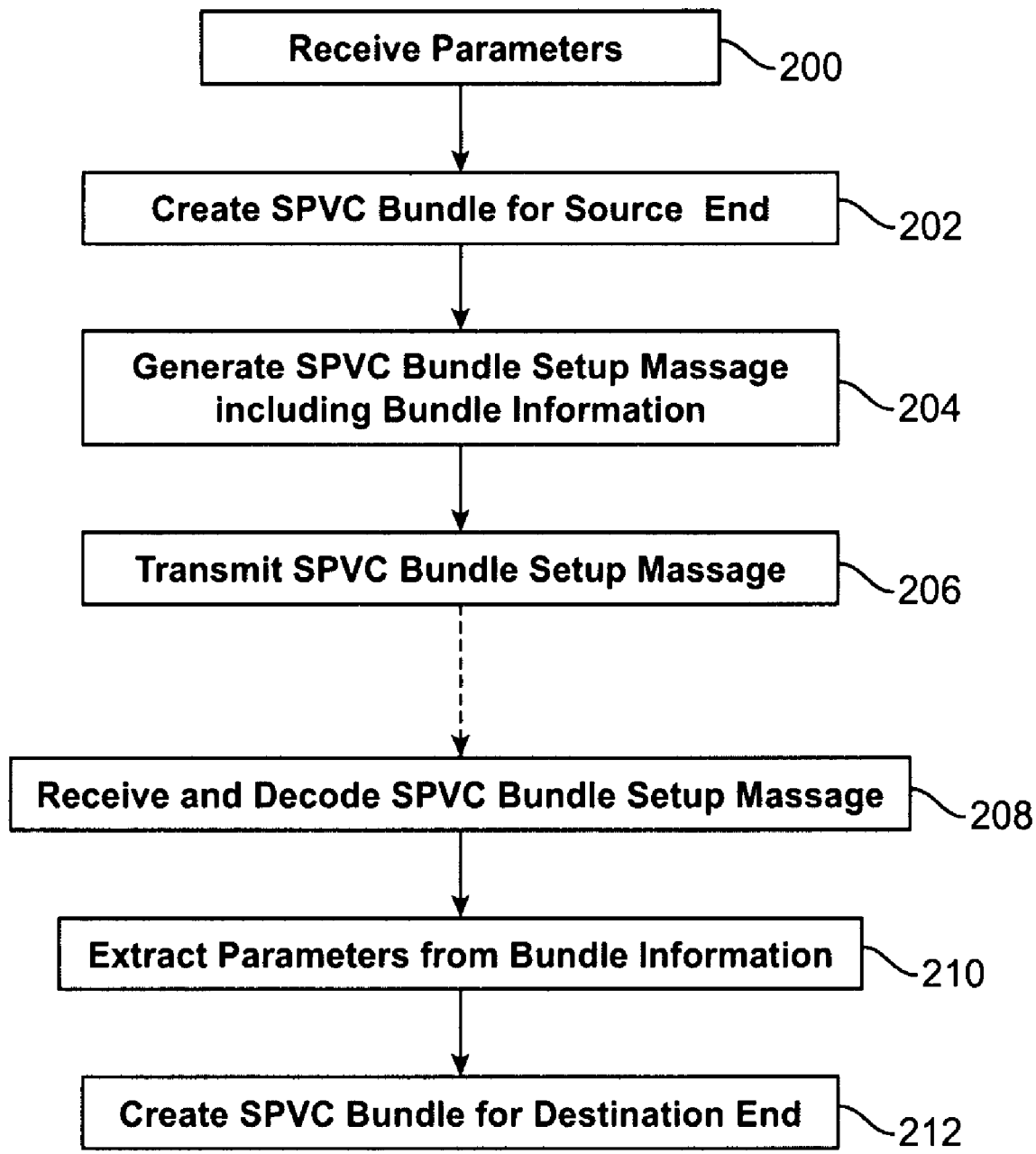
FIG. 6 is a process flow diagram schematically illustrating a method for creating a bundle of SPVCs coupling form a source end to a destination end via a communications network, in accordance with one embodiment of the present invention.

FIG. 6 schematically illustrates a method for creating a bundle of SPVCs coupling form a source end to a destination end via a communications network, in accordance with one embodiment of the present invention. This method may be performed by, or implemented in the network device 70 and/or 170 described above. First, parameters defining an SPVC bundle is received at the source end (200), for example, through an interface such as a command line interface. The parameters may include bundle-level parameters and parameters for individual member SPVCs.

The SPVC bundle is created for the source end in accordance with the parameters (202). As described above, the SPVC bundle includes a plurality of member SPVCs, and each member SPVC includes a PVC and an SVC. Each of the member SPVCs is associated with a respective connection characteristic. Such creation may include a bundle-mode in which the SPVC bundle is configured using the bundle-level parameters, and a member-mode in which individual member SPVC are configured to have a different connection characteristic. For example, each of the member SPVCs may be associated with a respective IP precedence level.

An SPVC setup message containing configuration information of the SPVC bundle is created (204), and transmitted from the source end to the destination end (206). For example, the creation of the SPVC setup massage may include formatting the configuration information and encoding the data for a specific transmission or signaling mechanism. The transmission may use ATM signaling scheme using PNNI protocol, as described above. Especially GAT IE may be used to transmit the bundle information from the source end to the destination end. At the destination end, the SPVC bundle for the destination end is automatically created in response to the SPVC setup message and in accordance with the configuration information.

By utilizing the signaling and sending an SPVC setup request containing bundle information, the SPVC bundle is automatically setup at the destination end. Thus, the user (system administrator) does not have to configure the SPVC bundle at the destination end, relieving the time-consuming and error-prone manual configuration process.

At the destination end, the SPVC setup message containing SPVC bundle information is received and decoded (208). The parameters are extracted from the SPVC bundle information (210), and the SPVC bundle is created based on the extracted parameters (212), such that each of the member SPVCs is associated with a respective connection characteristic. A PVC connection and an SVC connection are allocated on the destination network device for each member SPVC.

As described above, in accordance with one embodiment of the present invention, different IP precedence levels of incoming connections (IP traffic) can be mapped onto member SPVCs of an SPVC bundle with different connection characteristics such that IP QoS is preserved across an ATM network. The present invention can be implemented, for example, using ATM route module or node route processors in a network device such as a switch router, router, access concentrator, or the like.

In accordance with one embodiment of the present invention, since the SPVC bundle is automatically created at the destination network device based on the bundle information transmitted from the source network device via signaling mechanism, there is no need for an system administrators to log into both of the originating (source) and terminating (destination) network devices and replicate the configuration. This reduces the configuration time and eliminates configuration errors or configuration mismatch. In addition, in accordance with one embodiment of the present invention, an SPVC bundle can be created where the originating equipment (or system administrator) may not have access to the terminating equipment such as an environment where the originating location is managed by a service provider and the terminating equipment is located in a corporate environment, for example, from a branch office of a corporation to the headquarter of the corporation.

Furthermore, although the conventional static dual-side (dual-ended) configuration implementation does not allow change in the configuration, in accordance with one embodiment of the present invention, the configuration can be modified at the source end and dynamically replicated on the destination side. For example, when service-level agreements (SLAs) are changed, the service provider does not have to change the configuration on the both sides, but the configuration change is only required on the source side.

In addition, in accordance with one embodiment of the present invention, the SPVC bundle provides retry and auto-bumping facilities. Thus, as described above, when the failed member SPVC (or failed interface) comes up, the retry mechanism of SPVCs automatically put back the bumped traffic onto the restored member SPVC, and the destination-side configuration is also automatically restored.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for creating a bundle of soft permanent virtual circuits (SPVCs) coupling from a source end to a destination end via a communication network, the method comprising:

creating an SPVC bundle for the source end, the SPVC bundle comprising a plurality of member SPVCs, each member SPVC comprising a permanent virtual circuit (PVC) and a switched virtual circuit (SVC), each of the member SPVCs being associated with a respective connection characteristic and coupling to a same destination, wherein each of the connection characteristics includes a respective quality of service (QoS) parameter that is maintained as Internet Protocol (IP) packets propagate from the source end, over the communication network, and to the destination end;

transmitting, from the source end to the destination end, an SPVC setup message containing configuration information of the SPVC bundle, the configuration information comprising bumping rules for individual member SPVCs, the bumping rules specifying to which member SPVC traffic should be bumped when a specific member SPVC fails; and associating each of the member SPVCs with a respective Internet Protocol (IP) precedence level, and wherein a first precedence level is used for an unspecified bit rate (UBR), a second precedence level is used for video data, and a third precedence level is used for voice data, the precedence levels being used in bumping rules for the IP packets such that the QoS parameter is maintained as the IP packets propagate from the source end to the destination end, wherein the transmitting includes signalling the SPVC setup message containing the SPVC bundle information using the Generic Application Transport information element (GAT IE).

2. The method in accordance with claim 1, further comprising:
receiving parameters defining the SPVC bundle at the source end, the configuration information transmitted to the destination end corresponding to the parameters.

3. The method in accordance with claim 1, further comprising:
automatically creating, at the destination end, in response to the SPVC setup message, the SPVC bundle for the destination end in accordance with the configuration information.

4. The method in accordance with claim 1, wherein the respective connection characteristic comprises at least one of:
a traffic parameter.

5. The method in accordance with claim 1, wherein the configuration information comprises:
bundle-level parameters; and
parameters for individual member SPVCs.

6. The method in accordance with claim 5, wherein the bundle-level parameters comprises:
network service access point (NSAP) address;
encapsulation parameters; and
address map parameters.

7. The method in accordance with claim 5, wherein the parameters for individual member SPVCs comprise at least one of:
traffic parameters; and
VPI/VCI values.

8. The method in accordance with claim 7, wherein the parameters for individual member SPVCs further comprise at least one of:
Internet Protocol (IP) precedence levels; and
parameters specifying bumping rules.

9. A method for creating, at a destination network device, a bundle of soft permanent virtual circuits (SPVCs) coupling from a source network device to the destination network device via a communications network, the method comprising:

receiving and decoding an SPVC setup message containing SPVC bundle information for creating an SPVC bundle coupled from a specified source end, the SPVC bundle comprising a plurality of member SPVCs, each of the member SPVC comprising a permanent virtual circuit (PVC) and a switched virtual circuit (SVC);

extracting parameters from the SPVC bundle information, the parameters comprising bumping rules for individual member SPVCs, the bumping rules specifying to which member SPVC traffic should be bumped when a specific member SPVC fails; and creating the SPVC bundle based on the extracted parameters, each of the member SPVCs being associated with a respective connection characteristic and coupled from the specified source end, wherein each of the connection characteristics includes a respective quality of service (QoS) parameter that is maintained as Internet Protocol (IP) packets propagate from the source end, over the communication network, and to the destination network device, wherein each of the member SPVCs are associated with a respective Internet Protocol (IP) precedence level, and wherein a first precedence level is used for an unspecified bit rate (UBR), a second precedence level is used for video data, and a third precedence level is used for voice data, the precedence levels being used in bumping rules for the IP packets such that the QoS parameter is maintained as the IP packets propagate from the source end to the destination end, wherein the SPVC setup message includes the SPVC bundle information using the Generic Application Transport information element (GAT IE).

10. The method in accordance with claim 9, further comprising:
allocating a PVC connection and an SVC connection on the destination network device for each member SPVC.

11. The method in accordance with claim 9, wherein each of the member SPVCs is associated with an Internet Protocol (IP) precedence level.

12. The method in accordance with claim 9, wherein the parameters comprising:
bundle-level parameters; and
parameters for individual member SPVCs.

13. The method in accordance with claim 12, wherein the bundle-level parameters comprises:
network service access point (NSAP) address;
encapsulation parameters; and
address map parameters.

14. The method in accordance with claim 12, wherein the parameters for individual member SPVCs comprise at least one of:
traffic parameters; and
VPI/VCI values.

15. The method in accordance with claim 14, wherein the parameters for individual member SPVCs further comprise at least one of:
Internet Protocol (IP) precedence levels; and
parameters specifying bumping rules.

16. A network device for creating a bundle of soft permanent virtual circuits (SPVCs) coupling from a source end to a destination end via a communications network, the network device comprising:
an interface adapted to receive commands and parameters to create an SPVC bundle comprising a plurality of member SPVCs, each of the member SPVCs comprising a permanent virtual circuit (PVC) and a switched virtual circuit (SVC);

an SPVC bundle manager coupled to the interface, adapted to configure the SPVC bundle in accordance with the parameters, each of the member SPVCs being associated with a respective connection characteristic and coupling to a same destination, wherein each of the connection characteristics includes a respective quality of service (QoS) parameter that is maintained as Internet Protocol (IP) packets propagate from the source end, over the communication network, and to the destination end;

an SPVC manager coupled to the SPVC bundle manager, adapted to create an SPVC bundle setup request and SPVC bundle information based on data received from the SPVC bundle manager; and a signalling module coupled to the SPVC manager, adapted to encode and transmit an SPVC setup message containing the SPVC bundle information, the bundle information comprising bumping rules for individual member SPVCs, the bumping rules specifying to which member SPVC traffic should be bumped when a specific member SPVC fails, wherein each of the member SPVCs are associated with a respective Internet Protocol (IP) precedence level, and wherein a first precedence level is used for an unspecified bit rate (UBR), a second precedence level is used for video data, and a third precedence level is used for voice data, the precedence levels being used in bumping rules for the IP packets such that the QoS parameter is maintained as the IP packets propagate from the source end to the destination end, wherein the signaling module transmits the SPVC setup message containing the SPVC bundle information using the Generic Application Transport information element (GAT IE).

17. The network device in accordance with claim 16, wherein the SPVC bundle information comprises:
bundle-level parameters; and
parameters for individual member SPVCs.

18. The network device in accordance with claim 17, wherein the bundle-level parameters comprises:
network service access point (NSAP) address;
encapsulation parameters; and
address map parameters.

19. The network device in accordance with claim 17, wherein the parameters for individual member SPVCs comprise at least one of:
traffic parameters; and
VPI/VCI values.

20. The network device in accordance with claim 19, wherein the parameters for individual member SPVCs further comprise at least one of:
Internet Protocol (IP) precedence levels; and
parameters specifying bumping rules.

21. The network device in accordance with claim 16, wherein the SPVC bundle manager is further adapted to associate each of the member SPVCs with a respective Internet Protocol (IP) precedence level.

22. The network device in accordance with claim 16, further comprising:
a connection manager coupled to the SPVC bundle manager, adapted to allocate a PVC connection and an SVC connection on the network device for each of the member SPVCs.

23. A network device for a destination end of a bundle of soft permanent virtual circuits (SPVCs) coupling from a source end to the destination end via a communications network, the network device comprising:
a signalling module adapted to receive and decode an SPVC setup message containing SPVC bundle information for creating an SPVC bundle coupled from a specified source end, the SPVC bundle comprising a plurality of member SPVCs, each of the member SPVC comprising a permanent virtual circuit (PVC) and a switched virtual circuit (SVC), the bundle information comprising bumping rules for individual member SPVCs, the bumping rules specifying to which member SPVC traffic should be bumped when a specific member SPVC fails; and an SPVC bundle manager adapted to extract parameters from the SPVC bundle information and to create the SPVC bundle, each of the member SPVCs being associated with a respective connection characteristic and coupled from the specified source end, wherein each of the connection characteristics includes a respective quality of service (QoS) parameter that is maintained as Internet Protocol (IP) packets propagate from the source end, over the communication network, and to the destination end, wherein each of the member SPVCs are associated with a respective Internet Protocol (IP) precedence level, and wherein a first precedence level is used for an unspecified bit rate (UBR), a second precedence level is used for video data, and a third precedence level is used for voice data, the precedence levels being used in bumping rules for the IP packets such that the QoS parameter is maintained as the IP packets propagate from the source end to the destination end, wherein the SPVC setup message includes the SPVC bundle information using the Generic Application Transport information element (GAT IE).

24. The network device in accordance with claim 23, wherein the parameters comprising:
bundle-level parameters; and
parameters for individual member SPVCs.

25. The network device in accordance with claim 24, wherein the bundle-level parameters comprises:
network service access point (NSAP) address;
encapsulation parameters; and
address map parameters.

26. The network device in accordance with claim 24, wherein the parameters for individual member SPVCs comprise at least one of:
traffic parameters; and
VPI/VCI values.

27. The network device in accordance with claim 26, wherein the parameters for individual member SPVCs further comprise at least one of:
Internet Protocol (IP) precedence levels; and
parameters specifying bumping rules.

28. The network device in accordance with claim 23, wherein each of the member SPVCs is associated with an Internet Protocol (IP) precedence level.

29. The network device in accordance with claim 23, further comprising:
a connection manager coupled to the SPVC bundle manager, adapted to allocate a PVC connection and an SVC connection on the destination network device for each member SPVC.

30. A system for creating a bundle of soft permanent virtual circuits (SPVCs) coupling from a source end to a destination end via a communications network, the system comprising:
a source network device, comprising:

an interface adapted to receive commands and parameters to create an SPVC bundle comprising a plurality of member SPVCs, each of the member SPVC comprising a permanent virtual circuit (PVC) and a switched virtual circuit (SVC), the parameters comprising bumping rules for individual member SPVCs, the bumping rules specifying to which member SPVC traffic should be bumped when a specific member SPVC fails;

a first SPVC bundle manager coupled to the interface, adapted to configure an SPVC bundle to a specified destination bundle based on the parameters, each of the member SPVCs being associated with a respective connection characteristic and coupling to a same destination;

a first SPVC manager coupled to the first SPVC bundle manager, adapted to create an SPVC bundle setup request and SPVC bundle information based on data received from the first SPVC bundle manager; and a first signalling module coupled to the first SPVC manager, adapted to encode and transmit an SPVC setup message containing the SPVC bundle information; and a destination network device, comprising:

a second signalling module adapted to receive and decode the SPVC setup message containing the SPVC bundle information; and a second SPVC bundle manager, adapted to extract parameters from the SPVC bundle information to configure the SPVC bundle and create the member SPVCs for the destination end, wherein each of the connection characteristics includes a respective quality of service (QoS) parameter that is maintained as Internet Protocol (IP) packets propagate from the source end, over the communication network, and to the destination end, wherein each of the member SPVCs are associated with a respective Internet Protocol (IP) precedence level, and wherein a first precedence level is used for an unspecified bit rate (UBR), a second precedence level is used for video data, and a third precedence level is used for voice data, the precedence levels being used in bumping rules for the IP packets such that the QoS parameter is maintained as the IP packets propagate from the source end to the destination end, wherein the SPVC setup message includes the SPVC bundle information using the Generic Application Transport information element (GAT IE).

31. The system in accordance with claim 30, wherein the SPVC bundle information comprising:
bundle-level parameters; and
parameters for individual member SPVCs.

32. The system in accordance with claim 31, wherein the bundle-level parameters comprises:
network service access point (NSAP) address;
encapsulation parameters; and
address map parameters.

33. The system in accordance with claim 31, wherein the parameters for individual member SPVCs comprise at least one of:
traffic parameters; and
VPI/VCI values.

34. The system in accordance with claim 33, wherein the parameters for individual member SPVCs further comprise at least one of:
Internet Protocol (IP) precedence levels; and
parameters specifying bumping rules.

35. The system in accordance with claim 30, wherein the first SPVC bundle manager is further adapted to associate each of the member SPVCs with an Internet Protocol (IP) precedence level.

36. The system in accordance with claim 30, wherein the source network device further comprises:
a first connection manager coupled to the first SPVC bundle manager, adapted to allocate a PVC connection and an SVC connection on the source network device for each member SPVC.

37. The system in accordance with claim 30, wherein the destination network device further comprises:
a second connection manager coupled to the second SPVC bundle manager, adapted to allocate a PVC connection and an SVC connection on the destination network device for each member SPVC.

38. An Apparatus for creating a bundle of soft permanent virtual circuits (SPVCs) coupling from a source end to a destination end via a communications network, the apparatus comprising:

means for creating an SPVC bundle for the source end, the SPVC bundle comprising a plurality of member SPVCs, each member SPVC comprising a permanent virtual circuit (PVC) and a switched virtual circuit (SVC), each of the member SPVCs being associated with a respective connection characteristic and coupling to a same destination, wherein each of the connection characteristics includes a respective quality of service (QoS) parameter that is maintained as Internet Protocol (IP) packets propagate from the source end, over the communication network, and to the destination end; and means for transmitting, from the source end to the destination end, an SPVC setup message containing configuration information of the SPVC bundle, the configuration information comprising bumping rules for individual member SPVCs, the bumping rules specifying to which member SPVC traffic should be bumped when a specific member SPVC fails, wherein each of the member SPVCs are associated with a respective Internet Protocol (IP) precedence level, and wherein a first precedence level is used for an unspecified bit rate (UBR), a second precedence level is used for video data, and a third precedence level is used for voice data, the precedence levels being used in bumping rules for the IP packets such that the QoS parameter is maintained as the IP packets propagate from the source end to the destination end, wherein the SPVC setup message includes the SPVC bundle information using the Generic Application Transport information element (GAT IE).

39. The apparatus in accordance with claim 38, further comprising:
means for receiving parameters defining the SPVC bundle at the source end, the configuration information transmitted to the destination end corresponding to the parameters.

40. The apparatus in accordance with claim 38, wherein the configuration information comprises:
bundle-level parameters; and
parameters for individual member SPVCs.

41. The apparatus in accordance with claim 38, further comprising:
means for associating each of the member SPVCs with a respective Internet Protocol (IP) precedence level.

42. A apparatus for creating, at a destination end, a bundle of soft permanent virtual circuits (SPVCs) coupling from a source end to the destination end via a communications network, the apparatus comprising:
means for receiving and decoding an SPVC setup message containing SPVC bundle information for creating an SPVC bundle coupled from a specified source end, the SPVC bundle comprising a plurality of member SPVCs, each of the member SPVC comprising a permanent virtual circuit (PVC) and a switched virtual circuit (SVC);
means for extracting parameters from the SPVC bundle information, the parameters comprising bumping rules for individual member SPVCs, the bumping rules specifying to which member SPVC traffic should be bumped when a specific member SPVC fails; and
means for creating the SPVC bundle based on the extracted parameters, each of the member SPVCs being associated with a respective connection characteristic and coupled from the specified source end, wherein each of the connection characteristics includes a respective quality of service (QoS) parameter that is maintained as Internet Protocol (IP) packets propagate from the source end, over the communication network, and to the destination end, wherein each of the member SPVCs are associated with a respective Internet Protocol (IP) precedence level, and wherein a first precedence level is used for an unspecified bit rate (UBR), a second precedence level is used for video data, and a third precedence level is used for voice data, the precedence levels being used in bumping rules for the IP packets such that the QoS parameter is maintained as the IP packets propagate from the source end to the destination end, wherein the SPVC setup message includes the SPVC bundle information using the Generic Application Transport information element (GAT IE).

43. The apparatus in accordance with claim 42, wherein the parameters comprising:
bundle-level parameters; and
parameters for individual member SPVCs.

44. The apparatus in accordance with claim 42, further comprising:
means for allocating a PVC connection and an SVC connection on the destination network device for each member SPVC.

45. A non-transitory program storage device readable by a machine, tangibly embodying a program of instructions executable by the machine to perform a method for creating a bundle of soft permanent virtual circuits (SPVCs) coupling from a source end to a destination end via a communications network, the method comprising:
creating an SPVC bundle for the source end, the SPVC bundle comprising a plurality of member SPVCs, each member SPVC comprising a permanent virtual circuit (PVC) and a switched virtual circuit (SVC), each of the member SPVCs being associated with a respective connection characteristic and coupling to a same destination; and
transmitting, from the source end to the destination end, an SPVC setup message containing configuration information of the SPVC bundle, the configuration information comprising bumping rules for individual member SPVCs, the bumping rules specifying to which member SPVC traffic should be bumped when a specific member SPVC fails, wherein each of the connection characteristics includes a respective quality of service (QoS) parameter that is maintained as Internet Protocol (IP) packets propagate from the source end, over the communication network, and to the destination end, wherein each of the member SPVCs are associated with a respective Internet Protocol (IP) precedence level, and wherein a first precedence level is used for an unspecified bit rate (UBR), a second precedence level is used for video data, and a third precedence level is used for voice data, the precedence levels being used in bumping rules for the IP packets such that the QoS parameter is maintained as the IP packets propagate from the source end to the destination end, wherein the SPVC setup message includes the SPVC bundle information using the Generic Application Transport information element (GAT IE).

46. The non-transitory program storage device in accordance with claim 45, wherein the method further comprises:
receiving parameters defining the SPVC bundle at the source end, the configuration information transmitted to the destination end corresponding to the parameters.

47. The non-transitory program storage device in accordance with claim 45, wherein the configuration information comprises:
bundle-level parameters; and
parameters for individual member SPVCs.

48. The non-transitory program storage device in accordance with claim 45, wherein the method further comprises:
associating each of the member SPVCs with a respective Internet Protocol (IP) precedence level.

49. A non-transitory program storage device readable by a machine, tangibly embodying a program of instructions executable by the machine to perform a method for creating, at a destination network device, a bundle of soft permanent virtual circuits (SPVCs) coupling from a source network device to the destination network device via a communications network, the method comprising:
receiving and decoding an SPVC setup message containing SPVC bundle information for creating an SPVC bundle coupled from a specified source end, the SPVC bundle comprising a plurality of member SPVCs, each of the member SPVC comprising a permanent virtual circuit (PVC) and a switched virtual circuit (SVC);
extracting parameters from the SPVC bundle information, the parameters comprising bumping rules for individual member SPVCs, the bumping rules specifying to which member SPVC traffic should be bumped when a specific member SPVC fails; and
creating the SPVC bundle based on the extracted parameters, each of the member SPVCs being associated with a respective connection characteristic and coupled from the specified source end, wherein each of the connection characteristics includes a respective quality of service (QoS) parameter that is maintained as Internet Protocol (IP) packets propagate from the source end, over the communication network, and to the destination network device, wherein each of the member SPVCs are associated with a respective Internet Protocol (IP) precedence level, and wherein a first precedence level is used for an unspecified bit rate (UBR), a second precedence level is used for video data, and a third precedence level is used for voice data, the precedence levels being used in bumping rules for the IP packets such that the QoS parameter is maintained as the IP packets propagate from the source end to the destination end, wherein the SPVC setup message includes the SPVC bundle information using the Generic Application Transport information element (GAT).

50. The non-transitory program storage device in accordance with claim 49, wherein the parameters comprising:
bundle-level parameters; and
parameters for individual member SPVCs.

51. The non-transitory program storage device in accordance with claim 49, wherein the method further comprises:
allocating a PVC connection and an SVC connection on the destination network device for each member SPVC.

* * * * *